United States Patent [19]

Sakakibara et al.

[11] Patent Number: 4,864,889
[45] Date of Patent: Sep. 12, 1989

[54] CONTINUOUSLY VARIABLE TRANSMISSION

[75] Inventors: Shiro Sakakibara, Toyokawa; Masashi Hattori, Anjo, both of Japan

[73] Assignee: Aisin-Warner Kabushiki Kaisha, Anjo, Japan

[21] Appl. No.: 46,372

[22] Filed: May 4, 1987

[30] Foreign Application Priority Data

May 6, 1986 [JP] Japan .................. 61-103500
Sep. 1, 1986 [JP] Japan .................. 61-205614

[51] Int. Cl.$^4$ ........................................... F16H 37/02
[52] U.S. Cl. ........................................... 74/689; 74/740
[58] Field of Search .................. 74/740, 689, 705, 701, 74/665 GE

[56] References Cited

U.S. PATENT DOCUMENTS

| | | | |
|---|---|---|---|
| 4,530,256 | 7/1985 | Hattori | 74/689 |
| 4,553,450 | 11/1985 | Gizard | 74/665 GE X |
| 4,589,303 | 5/1986 | Roberts | 74/740 X |
| 4,599,916 | 7/1986 | Hirosawa | 74/689 |
| 4,608,885 | 9/1986 | Koivunen | 74/689 |
| 4,630,504 | 12/1986 | Smirl | 74/689 |
| 4,644,820 | 2/1987 | Macey et al. | 74/689 |
| 4,660,438 | 4/1987 | Tatara et al. | 74/689 |

FOREIGN PATENT DOCUMENTS

| | | | |
|---|---|---|---|
| 0147646 | 7/1985 | European Pat. Off. | 74/689 |
| 3212769 | 10/1983 | Fed. Rep. of Germany | 74/740 |
| 0049455 | 5/1981 | Japan | 74/689 |
| 0090155 | 7/1981 | Japan | 74/689 |
| 2025545 | 1/1980 | United Kingdom | 74/689 |
| 1603853 | 12/1981 | United Kingdom | 74/689 |

Primary Examiner—Dwight G. Diehl
Attorney, Agent, or Firm—Kanesaka and Takeuchi

[57] ABSTRACT

A belt driven continuously variable transmission unit which converts the rotation of the input member by continuously variable ratios, and a gear unit such as a planetary gear unit to which the output torque from said continuously variable transmission unit and torque from said input member transmitted through a transfer unit is fed and delivered to the output member, are provided. A clutch and arresting member, such as a brake and one-way clutch are provided on the input path to said gear unit from said transfer unit. When the arresting member is actuated to low speed mode, the gear unit functions as a reduction mechanism, whereas when the arresting member is engaged to high speed mode, the gear unit functions as a split-drive mechanism which combines the output torque from said continuously variable transmission unit with the torque transmitted through said transfer unit. Formation of torque loop is prevented while combining the torques, by driving the element of the gear unit which supports reaction when the gear unit is functioning as a reduction mechanism.

11 Claims, 23 Drawing Sheets

| | | C1 | C2 | CL | B1 | B2 | F |
|---|---|---|---|---|---|---|---|
| P | | | | | ○ | | |
| R | | | | | ○ | ○ | |
| N | | | | | ○ | | |
| D | L | ○ | | ○※ | | | ○ |
| | H | ○ | ○ | ○※ | | | |
| S | L | ○ | | ○※ | ○ | | ○ |
| | H | ○ | ○ | ○※ | | | |

PRIOR ART

CONTINUOUSLY VARIABLE TRANSMISSION

BACKGROUND OF THE INVENTION (a) Field of the Invention

The present invention relates to a continuously variable transmission, particularly to a continuously variable transmission incorporating a belt (or chain) driven continuously variable transmission unit, and more specifically to a continuously variable transmission with the range of torque ratio expanded by the use of means such as planetary gear units.

(b) Description of the Prior Art

Due to rising demands for improvement in fuel economy in recent years, more attention is being paid to the use of continuously variable transmissions incorporating belt driven continuously variable transmission units as transmissions for motor vehicles.

Such continuously variable transmission generally includes a belt driven continuously variable transmission unit, a fluid coupling (or electromagnetically operated powder clutch), a reversing unit, a reduction gear unit and a differential gear unit. The range of torque ratio for such continuously variable transmission is limited due to restrictions imposed by availabe space and the minimum allowable radius of belt curvature. The torque range obtained from such continuously variable transmission alone is therefore insufficient to meet the demands for fuel economy and transmission performance on motor vehicles.

A continuously variable transmission has hence been proposed in which a planetrary gear unit is incorporated to expand the range of torque ratio, as disclosed in the unexamined publication of Japanese patent application (JP, A) 59-110954 (1984).

As illustrated in FIG. 23, the continuously variable transmission mentioned above includes a planetary gear unit 2 whose carrier C is connected to the output 5 of a belt driven continuously variable transmission unit 3, while either one of the ring gear R or the sun gear S (for example the sun gear) is connected to the input shaft 6 through a transfer unit 8 and the other (for example the ring gear) is connected to an output member such as a differential gear unit, with a clutch 10 and brake 11 provided between the input shaft 6 and the input 9 to the continuously variable transmission unit 3.

When the vehicle is running in forward direction, the rotation of input shaft 6 is converted under a designated torque ratio in the continuously variable transmission unit and transmitted through the clutch 10 to the carrier C of the planetary gear unit 2, and at the same time transmitted directly to the sun gear S through the transfer unit 8. The rotation of carrier C is thus amplified and delivered to the output member 7 from ring gear R. On the other hand, when the vehicle is running in reverse direction, brake 11 is applied and clutch 10 is disengaged, so that the rotation of the input shaft 6 is transmitted solely through the transfer unit 8 to sun gear S, to cause reverse rotation of ring gear R in cooperation with the carrier C which is in still condition.

In the continuously variable transmission incorporating a planetary gear unit 2 as described above, the combined sum of torques acting on the carrier C and sun gear S is delivered from the ring gear R. As the number of teeth on the ring gear R is normally quite large in relation to that on the sun gear S, a torque loop is formed, in which the torque acting on the carrier C is transmitted back to the input shaft 6 through the sun gear S and the transfer unit 8, and to the continuously variable transmission unit 3. A negative torque is hence transmitted to the sun gear through the transfer unit 8, and as a result the continuously variable transmission unit 3 has to convey a torque larger than that finally transmitted to the output member 7 in order to compensate for this negative torque. For example, if the ratio $\rho(Z_s/Z_r)$ between the numbers of teeth on the sun gear ($Z_s$) and ring gear ($Z_r$) is 0.5, from $$T_c + T_r + T_s = 0$$

and $$T_s = \rho T_r$$

($T_c$=torque on carrier, $T_r$=torque on ring gear, $T_s$=torque on sun gear) we obtain $$T_c = T_r + T_s$$

$$= (1+\rho)T_r$$

$$= 1.5 T_r.$$

In other words, the torque $T_c$ on the carrier, which is the torque transmitted from the input shaft 6 through the continuously variable transmission unit 3, is 1.5 times the torque $T_r$ on the ring gear, or the output torque transmitted to the output member 7.

Therefore, while it is possible to expand the range of torque ratio with this continuously variable transmission of prior art, there occurs the problem of the belt driven continuously variable transmission unit being subjected to a significantly larger torque.

As a result, excessive torque is exerted on the belt driven continuously variable transmission unit which, due to its dependence on friction for power transmission, is the least structurally reliable element among the entire continuously variable transmission system. Combined with the requirement for large side force on the pulleys to transmit the torque, the durability and efficiency of the continuously variable transmission could be impaired.

SUMMARY OF THE INVENTION

An objective of the present invention is to provide a continuously variable transmission in which the formation of torque loop is avoided while expanding the range of transmission torque ratio, by the provision of a gear unit such as a planetary gear unit which serves simply as a reduction mechanism in low speed mode, and as a split-drive mechanism in high speed mode.

Another objective of the present invention is to provide a continuously variable transmission with improved durability and transmission efficiency, by reducing the share of torque transmitted by the continuously variable transmission unit while increasing the share of torque transmitted by the transfer unit with a higher transmission efficiency, in high speed mode which occupies a larger share of the running time.

Yet another objective of the present invention is to provide a continuously variable transmission which enables a swift kick-down, by switching the role of the planetary gear unit from split-drive to reduction mechanism.

The present invention has been made in view of the above considerations, and is characterized by the inclusion of a gear unit (for example a planetary gear unit) provided with a reduction mechanism which multiplies the output torque from the continuously variable transmission unit (for example a belt driven continuously variable transmission unit) and transmits it to the output member, and a split-drive mechanism which combines the output torque from the continuously variable transmission unit with the torque from the transfer unit and transmits the combined torque to the output member, and further, with a selector means for selectively activating either of the reduction or split-drive mechanisms. Referring to FIG. 1 for example, in low speed mode, the reduction mechanism is activated by operating the arresting means F or B1 constituting the selector means, to immobilize the third element 20S of the planetary gear unit, and in high speed mode, the split-drive mechanism is activated by engaging the clutch C1 constituting the selector means, to transmit torque from the continuously variable transmission unit 30 to the first element 20R of the planetary gear unit while transmitting torque to the third element 20S through the transfer unit 80.

BRIEF DESCRIPTION OF THE DRAWINGS

FIG. 4 illustrates the relationship between the torque ratio and the share of torque transmitted by the transfer unit, while

DESCRIPTION OF THE PREFERRED EMBODIMENT

The embodiments of the present invention shall now be described with reference to the figures.

Figures 1, 2:
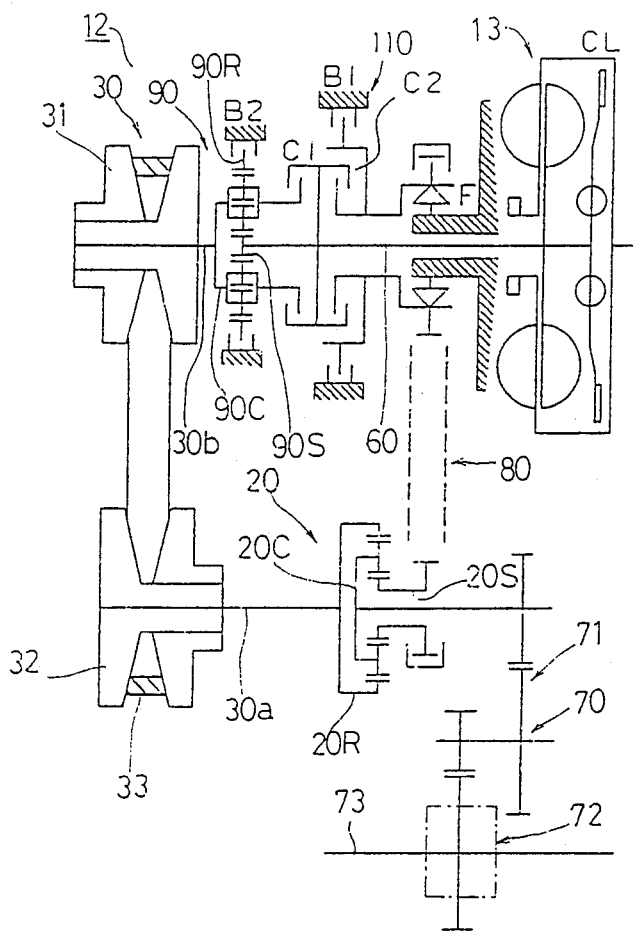
FIG. 1 is a schematic of a continuously variable transmission pertaining to the present invention.
FIG. 2 is a table indicating the state of each functional element of the selecting means when the shift selector is in each position.

As illustrated in FIG. 1 for example, the continuously variable transmission 12 includes a gear unit 20, a continuously variable transmission unit 30, a transfer unit 80, an input shaft 60, a selector means comprising a clutch C2 and arresting means F, B1, and an output member 70 comprising a reduction gear unit 71 and a differential gear unit 72. The gear unit 20 comprises a first element 20R operatively connected to the output 30a of the continuously variable transmission unit 30, a second element 20C operatively connected to the output member 70 and a third element 20S operatively connected to the transfer unit 80, where the third element which acts as a reaction supporting member when the gear unit is functioning as a reduction mechanism, is operatively connected to the arresting means F, B1 through the transfer unit 80, and is selectively connected and disconnected to the input shaft 60 through the clutch C2.

To be more specific, as shown in FIG. 1, the gear unit consists of a single planetary gear unit 20, the continuously variable transmission unit consists of a belt driven continuously variable transmission unit 30, and the transfer unit consists of a chain drive. The first, second and third element of the gear unit correspond respectively to the ring (or internal) gear 20R, the carrier 20C and the sun gear 20S of the planetary gear unit. Hence, the ring gear 20R of the planetary gear unit 20 is connected to to an output 30a of the continuously variable transmission unit 30, the carrier 20C is connected to the output member 70 and the sun gear 20S is connected to the low speed one-way clutch F, low speed coast and reverse brake B1 and high speed clutch C2 through the transfer unit 80.

The continuously variable transmission further includes a fluid coupling 13 with lock-up clutch CL, and a reversing unit 90 comprising a dual planetary gear unit. The sun gear 90S of the dual planetary gear unit 90 is connected to the input shaft 60, while the carrier 90C is connected to the input 30b of the continuously variable transmission unit 30 and the input shaft 60 through a forward clutch C1 and the ring gear 90R is connected to the reverse brake B2.

The clutches, brakes and one-way clutch of the continuously variable transmission desribed above are activated in combinations shown in FIG. 2, for each shift selector position. ✕ denotes that the lock-up clutch CL may be activated whenever appropriate.

In low speed mode in D range, the forward clutch C1 is engaged, and the low speed one-way clutch F becomes operable. Under this condition, rotation of the engine crank shaft is transmitted to the input shaft 60 through the lock-up clutch CL or the fluid coupling 13, and is further transmitted directly to the sun gear 90S of the dual planetary gear unit 90, and to the carrier 90C through the forward clutch C1. Hence the dual planetary gear unit 90 would rotate in unison with the input shaft 60 to transmit the rotation to the input 30b of the belt driven continuously variable transmission unit 30, the output of which is transmitted to the first element, in this case the ring gear 20R, of the single planetary gear unit 20. Meanwhile, the reaction supporting third element, in this case the sun gear 20S, is immobilized by the low speed one-way clutch F. The rotation of ring gear 20R is therefore reduced and taken out from the second element, in this case the carrier 20C, and transmitted to the axle 73 through the reduction gear unit 71 and differential gear unit 72.

In high speed mode in D range, the high speed clutch C2 is engaged as well as the forward clutch C1. Under this condition, the positive rotation transmitted through the continuously variable transmission unit 30 is taken from the output 30a and fed to the ring gear (first element) 20R of the single planetary gear unit 20, while rotation of the input shaft 60 is transmitted through the high speed clutch C2 and transfer unit 80 to the sun gear (third element) 20S of the single planetary gear unit 20. The torque acting on the ring gear 20R and the sun gear 20S are combined in the planetary gear unit 20 and delivered through the carrier (second element) 20C. No torque loop would occur during this process, as rotation counter to the reaction is transmitted to the sun gear 20S through the transfer unit, with a determined amount of positive torque. The combined torque from the carrier 20C is transmitted to the axle 73 through the reduction gear unit 71 and differential gear unit 72.

Whereas the continuously variable transmission becomes free in D range when subjected to reverse torque (when applying engine brake) due to action of the one-way clutch F, the low speed coast and reverse brake B1 is activated in addition to the low speed one-way clutch F in S range, to enable the continuously variable transmission to transmit power even under reverse torque.

In R range, the reverse brake B2 is activated as well as the low speed coast and reverse brake B1. Under this condition, rotation of the input shaft 60 is reversed due to the ring gear 90R in the dual planetary gear unit 90 being immobilized, and is fed to the continuously variable transmission unit 30, while the sun gear 20S of the single planetary gear unit 20 is immobilized by application of the low speed coast and reverse brake B1. Hence the reverse rotation supplied by the continuously variable transmission unit 30 is reduced in the planetary gear unit 20 and fed to the output member 70.

In P and N ranges, the low speed coast and reverse brake B1 alone is activated.

Figure 3A:
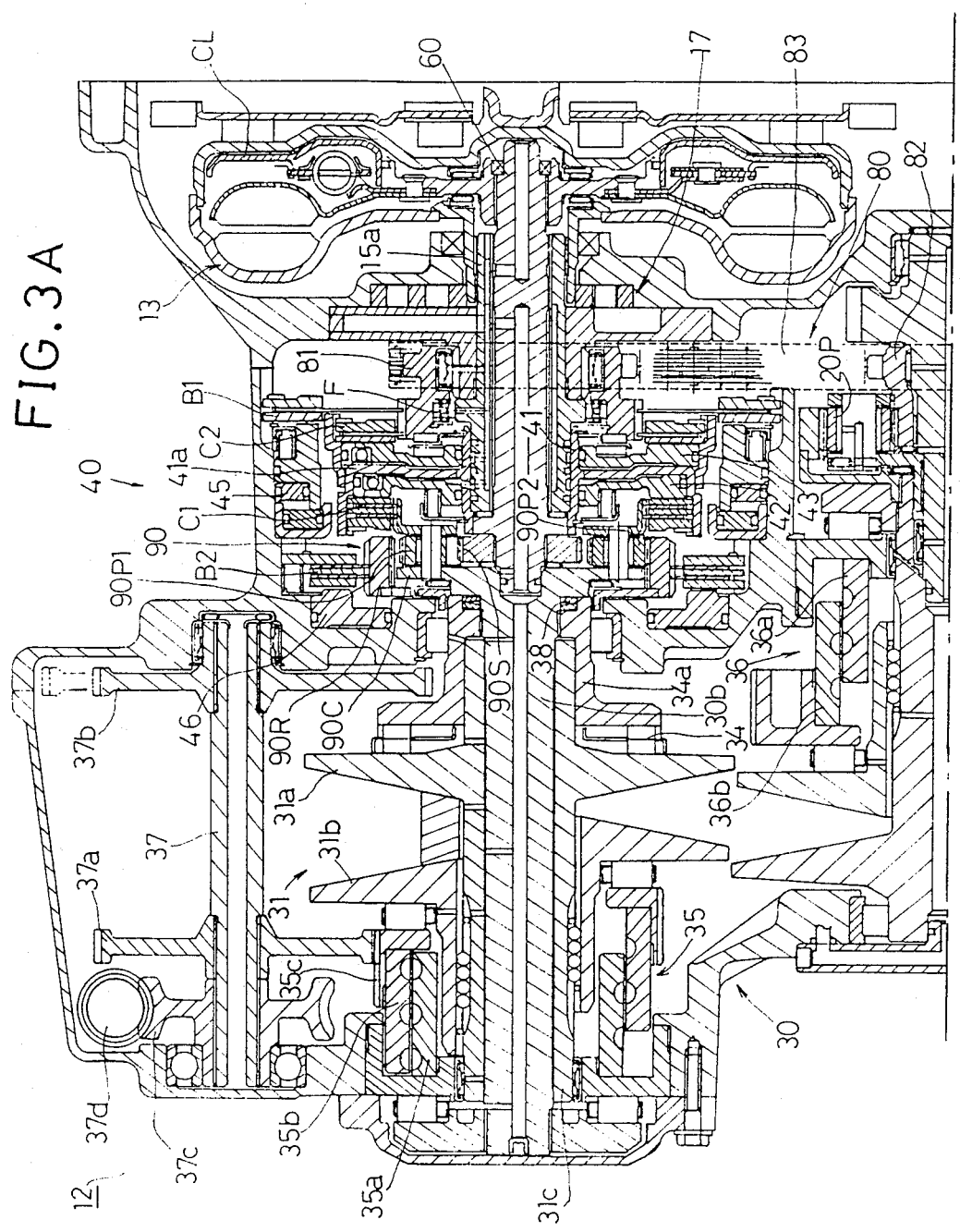
FIG. 3 (FIGS. 3A and 3B) is a cross sectional view illustrating an embodiment of the present invention.
Figure 3B:
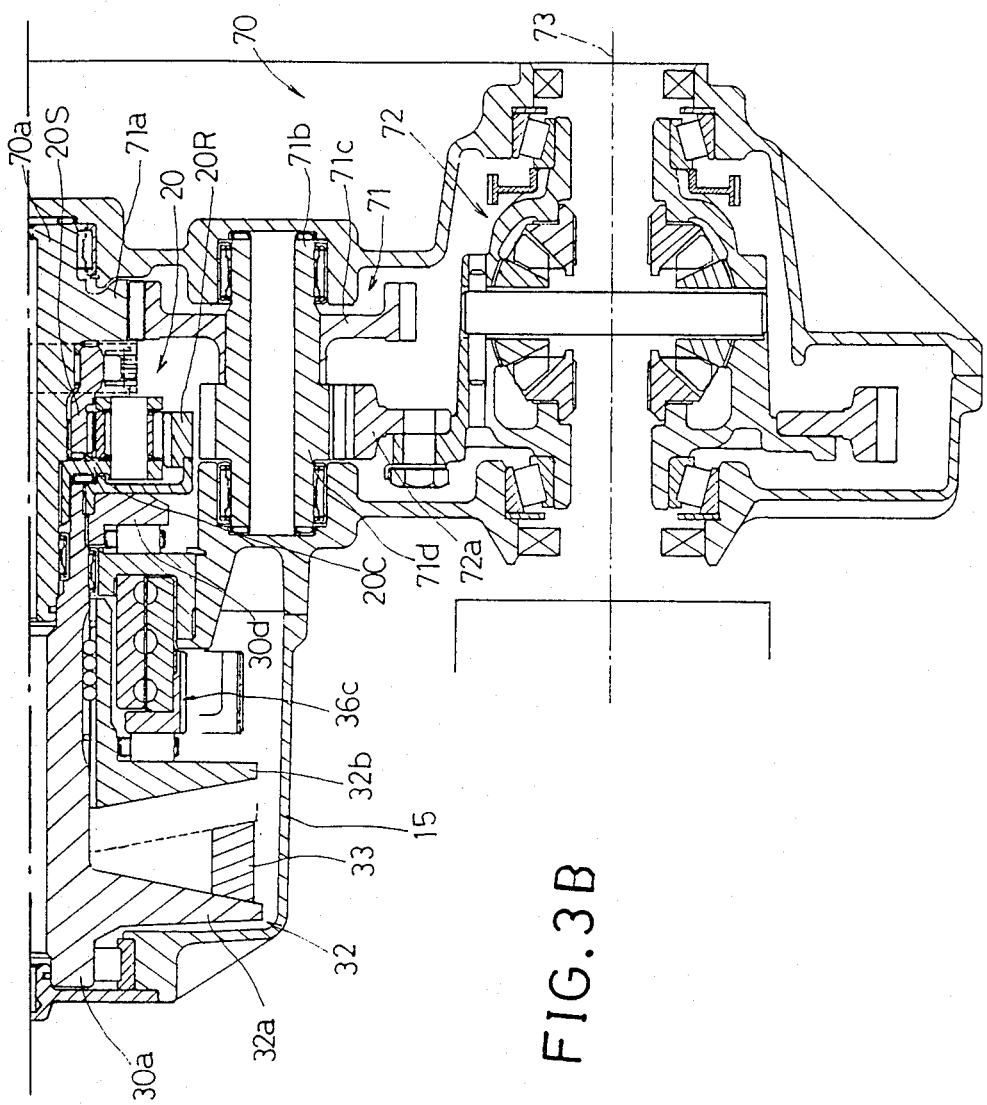

An example of the continuously variable transmission pertaining to the present invention shall now be described in detail, with reference to FIG. 3.

This continuously variable transmission has a three piece transmission housing 15, within which are located a primary shaft comprising an input shaft 60 and the input shaft 30b to a continuously variable transmission unit 30 mounted rotatably and coaxially to one another, and a secondary shaft comprising the output shaft 30a of the continuously variable transmission unit and a gear shaft 70a mounted rotatably and coaxially to one another. On the primary shaft are arranged, a fluid coupling 13 with lockup clutch CL, a control device comprising a forward clutch C1, a high speed clutch C2, a low speed coast and reverse brake B1, a reverse brake B2 and a low speed one-way clutch F, a dual planetary gear unit 90 and an oil pump 17, while on the second shaft is located a single planetary gear unit 20.

Going into the details of the control device and the input to the continuously variable transmission, the output members of the fluid coupling 13 and the lock-up clutch CL are fixed to one end of the input shaft 60, while the sun gear 90S of the dual planetary gear unit 90 is fixed to its other end, with a sleeve 15a fixed to the housing 15 being fitted around the input shaft. To the sleeve 15a is connected a sprocket 81 through the one-way clutch F, and a sleeve shaft 41 is rotatably mounted on the sleeve 15a. Forward clutch C1 is located on one side of a flange extending outward from the sleeve shaft 41 together with its hydraulic actuator 42, while on the other side, the high speed clutch C2 is located together with its hydraulic actuator 43. The driven member of the high speed clutch C2 is connected to the hub of sprocket 81, while the sprocket hub is connected to the low speed coast and reverse brake B1 which is located on the housing 15 together with its hydraulic actuator 45. Meanwhile, the driven member of the forward clutch C1 is connected to the carrier 90C of the dual planetary gear unit 90, while the ring gear 90R of the dual planetary gear unit 90 is connected to the reverse brake B2 which is located on the housing 15 together with its hydraulic actuator 46. The carrier 90C rotatably supports pinions 90P1 which mesh with the sun gear 90S, and pinions 90P2 which mesh with the ring gear 90R, the pinions 90P1 and 90P2 also meshing with each other.

The continuously variable transmission unit 30, as described in detail in the U.S. Pat. No. 4,735,598, includes a primary pulley 31, a secondary pulley 32 and a belt 33 fitted around the two pulleys, where each pulley comprises a fixed sheave 31a, 32a and a movable sheave 31b, 32b. The primary pulley 31 is provided with a pressure regulating cam mechanism 34 which applies a variable axial force according to the transmitted torque, located in between the back side of the fixed sheave 31a and a thrust plate 34a rotatably supported by bearings and connected to rotate in unison with the input shaft 30b through several dish springs 38. The movable sheave 31b of the primary pulley 31 is slidably supported on the hub 31c of the fixed sheave 31a through ball splines, and is provided with a ball screw unit 35 on its back side. The male portion 35a of the ball screw unit is fixed to the housing 15 and is restricted from relative axial movement against input shaft 30b, while the female portion 35b is linked through thrust bearings to the movable sheave 31b to move axially together. The fixed sheave 32a of the secondary pulley 32 is in one piece with the output shaft 30a and is rotatably supported by the housing 15, while the movable sheave 32b is slidably supported by the output shaft 30a and restricted from relative rotation by ball splines. The moveble sheave 32b is provided with a ball screw unit 36 on its back side, whose male portion 36a is fixed to the housing 15 and restristed from relative axial movement against a flange 30d on the output shaft 30a by thrust bearings, while its female portion 36b is linked to the movable sheave 32b through thrust bearings to move together in axial direction.

A rotatable operating shaft 37 is located in between the input shaft 30b and the output shaft 30a. Although the operating shaft 37 is illustrated at the top in FIG. 3 which is a developed view, the operating shaft 37 is actually positioned midway between the input and output shafts 30b, 30a when viewed along the axial direction of the shafts. On the operating shaft 37 is fixed a circular gear 37a, a non-circular gear 37b and a worm wheel 37c, where the worm wheel 37c engages a worm 37d connected to an electric motor controlled by signals supplied from a control unit. The circular gear 37a engages an axially elongated circular gear 35c fixed to the female portion 35b of the ball screw unit 35 on the primary pulley 31, while the non-circular gear 37b engages an axially elongated non-circular gear 36c fixed to the female portion 36b of the ball screw unit 36 on the secondary pulley 32.

The single planetary gear unit 20 is located on the gear shaft 70a constituting the secondary shaft, with its ring gear 20R connected to the output shaft 30a of the belt driven continuously variable transmission unit 30 at a point adjacent to flange 30d. The sun gear 20S incorporating a sprocket 82 is rotatably supported on the gear shaft 70a, while the carrier 20C rotatably supporting pinions 20P is fixed to the gear shaft 70a.

A silent chain 83 is fitted around the sprocket 82 incorporated with the sun gear 20S on the gear shaft 70a and the sprocket 81 supported by the low speed one-way clutch F, to make up the transfer unit.

The gear shaft 70a and a pinion 71a incorporated with it constitutes the output member 70, in which pinion 71a engages a pinion 71c fixed to an intermediate shaft 71b. Another small pinion 71d is formed on the intermediate shaft, and engages a ring gear 72a fixed to the differential gear unit 72, completing the reduction gear unit. The left and right hand front axles 73, 73 extend from the differential gear unit 72.

The operation of the present embodiment shall now be described.

Rotation of the engine crank shaft is transmitted to the input shaft 60 through the lock-up clutch CL or the fluid coupling 13, and then to the sun gear 90S of the dual planetary gear unit 90 and the sleeve shaft 41. As the forward clutch C1 is engaged and the reverse brake B1 is released in D and S ranges, the sun gear 90S and carrier 90C, and hence the ring gear 90R all rotate together, to transmit positive rotation to the input shaft 30b of the belt driven continuously variable transmission 30.

Rotation of the input shaft 30b is in turn transmitted to the pressure regulating cam mechanism 34 through the thrust plate 34a, and further to the fixed sheave 31a of the primary pulley 31 and also to the the movable sheave 31b through the ball splines. During this process, an axial force variable according to the transmitted torque is applied by the pressure regulating cam mechanism 34 on the back side of the sheave 31a through dish springs 38, while the other sheave 31b is held in an axial position corresponding to the designated transmission ratio by the ball screw unit 35, with a reaction matching the aforementioned axial force acting on its back side of sheave 31b through thrust bearings, the primary pulley 31 thereby clamping the belt 33 with an axial force sufficient to convey the input torque. Rotation of the belt 33 is transmitted to the secondary pulley 32, and to the output shaft 30a.

Meanwhile, an electric motor is controlled according to signals from sensors which detect parameters such as the throttle setting and vehicle speed, to rotate the operating shaft 37 through the worm 37d and worm wheel 37c. Then the female portion 35b of the ball screw unit 35 on the primary pulley 31 is rotated through circular gears 37a and 35c, while the female portion 36b of the ball screw unit 36 on the secondary pulley 32 is rotated through the non-circular gears 37b and 36c. Thus the female portions 35b, 36b rotate in relation to the male portions 35a, 36a fixed to the housing 15, shifting the movable sheaves 31b, 32b through the thrust bearings, and adjusting the primary and secondary pulleys 31 and 32 to their required effective diameters, to obtain the designated torque ratio. During this process, although there would occur a deviation between the axial displacement in the ball screw units and the displacement of the movable sheaves which is determined by the belt 33, as both ball screw units move in linear relation to rotation, the movable sheave 32b of the secondary pulley 32 is displaced by the amount matching that determined by the belt as the ball screw unit 36 on the secondary pulley 32 is rotated through non-circular gears 37b and 36c to move in non-linear relation to the rotation of the operating shaft 37. The clamping force on the belt provided by sheaves 31a, 31b and 32a, 32b act as a tensile force on the input shaft 30b on the primary end without acting on the housing, and as a tensile force on the output shaft 30a on the secondary end without acting on the housing.

Rotation of the output shaft 30a of the belt driven continuously variable transmission unit 30 is transmitted to the ring gear 20R of the single planetary gear unit 20, and further transmitted to the gear shaft 70a through the carrier 20C.

In low speed mode in D range, the low speed one-way clutch F is operational, as indicated in FIG. 2. Hence when the sun gear 20S is subjected to reaction as torque is transmitted from the ring gear 20R to carrier 20C in the single planetary gear unit 20, it is prevented from rotating by the one-way clutch F through the transfer unit 80, and the single planetary gear unit 20 functions as a reduction mechanism. Therefore, rotation of the output shaft 30a of the belt driven continuously variable transmission 30 is simply reduced in the single planetary gear unit 20, then further reduced in the reduction gear unit 71 comprising gears 71a, 71c, 71d, intermediate shaft 71b and ring gear 72a, to be delivered to the left and right hand front axles 73, 73 through the differential gear unit 72.

When the throttle setting and vehicle speed reach predetermined values, the high speed clutch C2 is engaged under command from a control unit, to shift into high speed mode. Then rotation of the input shaft 60 is transmitted to the belt driven continuously variable transmission 30 as well as to the sprocket 81 through the sleeve shaft 41 and the high speed clutch C2, and further to the sun gear 20S of the single planetary gear unit 20 through the silent chain 83 and sprocket 82. The sprocket 81 on the input end of the transfer unit 80 begins to transmit torque smoothly without shock when the high speed clutch C2 is engaged, because the sprocket 81 is already supporting the reaction from the sun gear 20S of the single planetary gear unit 20 through the one-way clutch F. Thus the torque converted in the belt driven continuously variable transmission unit 30 and the torque transmitted through the transfer unit 80 are combined in the single planetary gear unit 20, the combined torque being transmitted to the gear shaft 70a from the carrier 20C, and further delivered to left and right hand front axles through the reduction gear unit 71 and the differential gear unit 72.

In low speed mode in S range, the sprocket 81 is prevented from rotation in either direction by application of the low speed coast and reverse brake B1, in order to transmit negative torque as well which occurs due to the use of engine brake. Operation in high speed mode in S range is identical to that in the high speed mode in D range.

In R range, the forward clutch C1 is disengaged while the reverse brake B2 is applied. Hence rotation of the input shaft 60 transmitted to the sun gear 90S of the dual planetary gear unit 90 is transmitted to the input shaft 30a of the belt driven continuously variable transmission unit in reverse direction due to the ring gear 90R being immobilized. The reacting torque from the sun gear 20S of the single planetary gear unit 20 acts in reverse direction on the sprocket 81 through the transfer unit 80, which is immobilized by the low speed coast and reverse brake B1.

Figure 4:
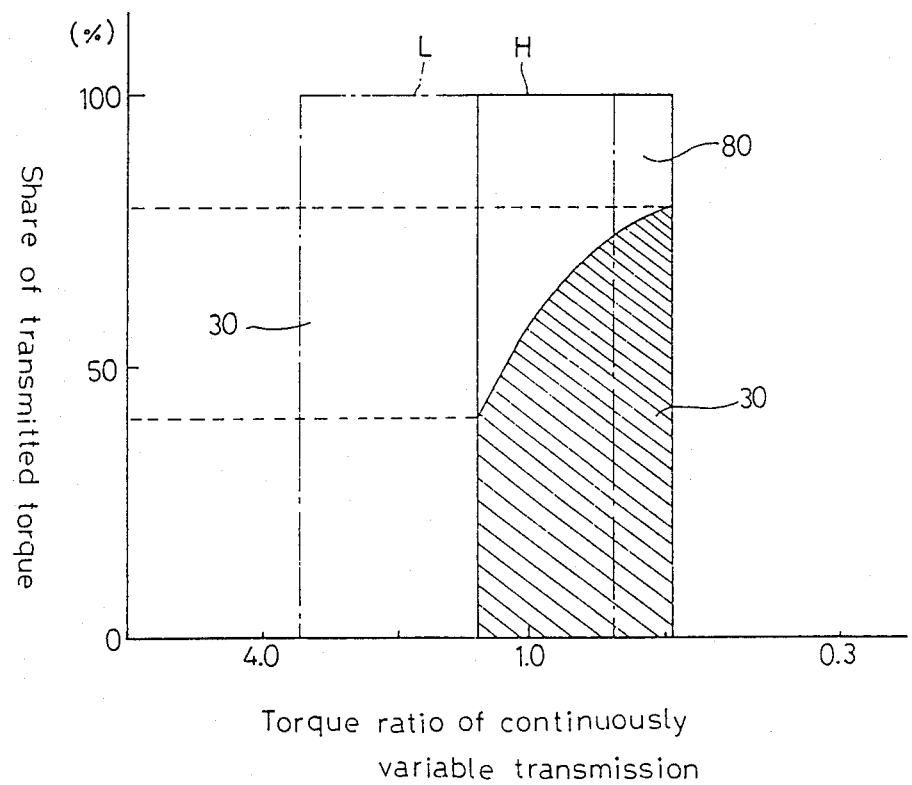

As shown in FIG. 4, in the transmission of torque through the continuously variable transmision 12, all of the transmitted torque passes through the belt driven continuously variable transmission unit 30 in the low speed mode, whereas in the high speed mode the transmitted torque is shared among the belt driven continuously variable transmission unit 30 and the transfer unit 80 in proportion according to the torque ratio of the entire continuously variable transmission.

Figure 5:
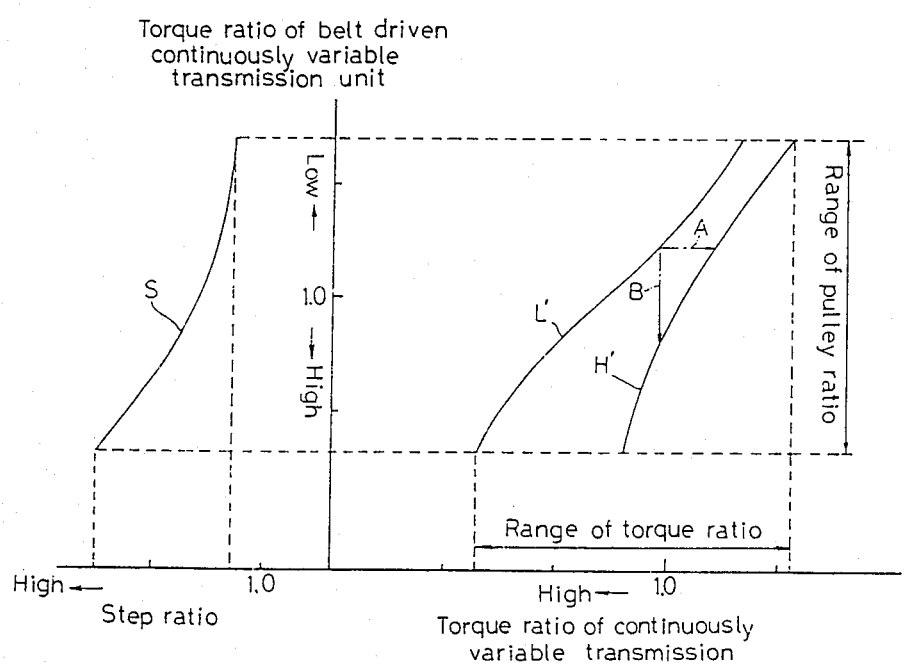
FIG. 5 illustrates the relationship of the step ratio and torque ratio of the entire continuously variable transmission with respect to the torque ratio of the belt driven continuously variable transmission unit.

Also, as shown in FIG. 5, the torque ratio of the continuously variable transmission 12 in relation to the torque ratio of the belt driven continuously variable transmission unit 30 follows curve L' in low speed mode L, and follows curve H' in high speed mode H. Therefore the step ratio (torque ratio in low speed mode/torque ratio in high speed mode) when shifting from low speed mode L to high speed mode H or vise versa, follows curve S'. When shifting from low speed mode L (L') to high speed mode H (H') or vise versa, it may be accomplished as indicated by broken line A, by simply engaging or disengaging the high speed clutch C2 without altering the torque ratio of the belt driven continuously variable transmission unit 30, or it may be accomplished as indicated by broken line B, by altering the torque ratio of the belt driven continuously variable transmission unit 30 by command from the control unit simultaneously when engaging or disengaging the high speed clutch C2, in order to avoid shift shock. The belt driven continuously variable transmission unit 30 may also be controlled to alter the torque ratios along any desired path in the area enclosed in between lines A and B.

Variations to the embodiment of the present invention shall now be described with reference to FIGS. 6 through 22. Components common to those described in FIGS. 1 and 3 are identified by the same symbols, and explations thereof are omitted.

Figure 6:
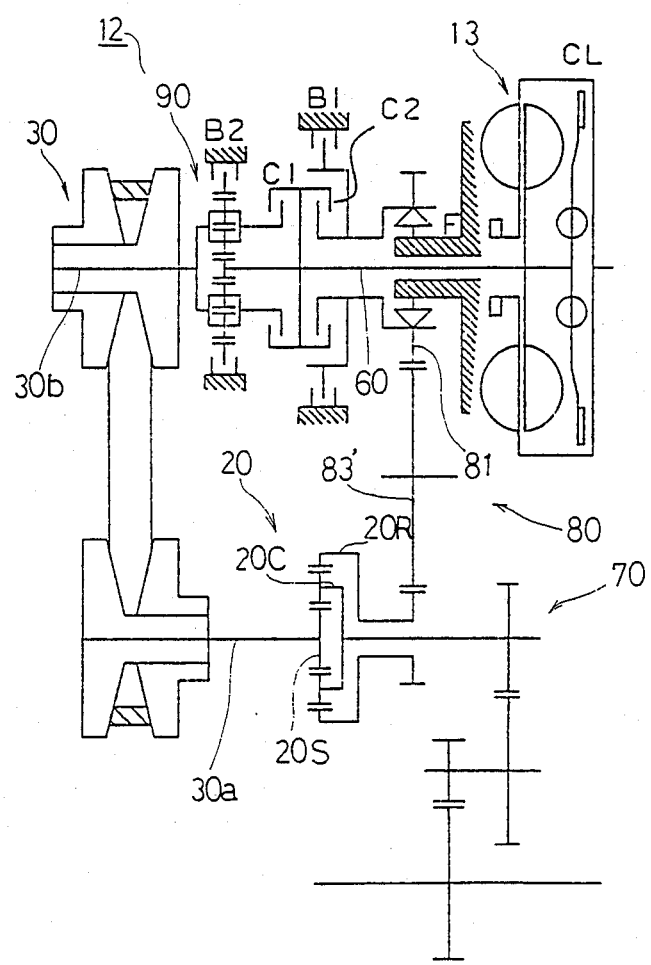
FIGS. 6 through 22 are schematics of other embodiments of the present invention.

In the example illustrated in FIG. 6, the sun gear 20S of the single planetary gear unit 20 is connected to the output shaft 30a of the belt driven continuously variable transmission unit 30, and the ring gear 20R is connected through the transfer unit 80, comprising a pinion 83', and high speed clutch C2 to the input shaft 60, and to the input 81 to the transfer unit 80 which could be immobilized by the low speed one-way clutch F or low speed coast and reverse brake B1.

For this example, the step ratio between the low and high speed modes L, H is increased, which would expand the range of torque ratio of the continuously variable transmission 12 as a result, and reduce the torque acting on the belt driven continuously variable transmission unit 30.

Figure 7:
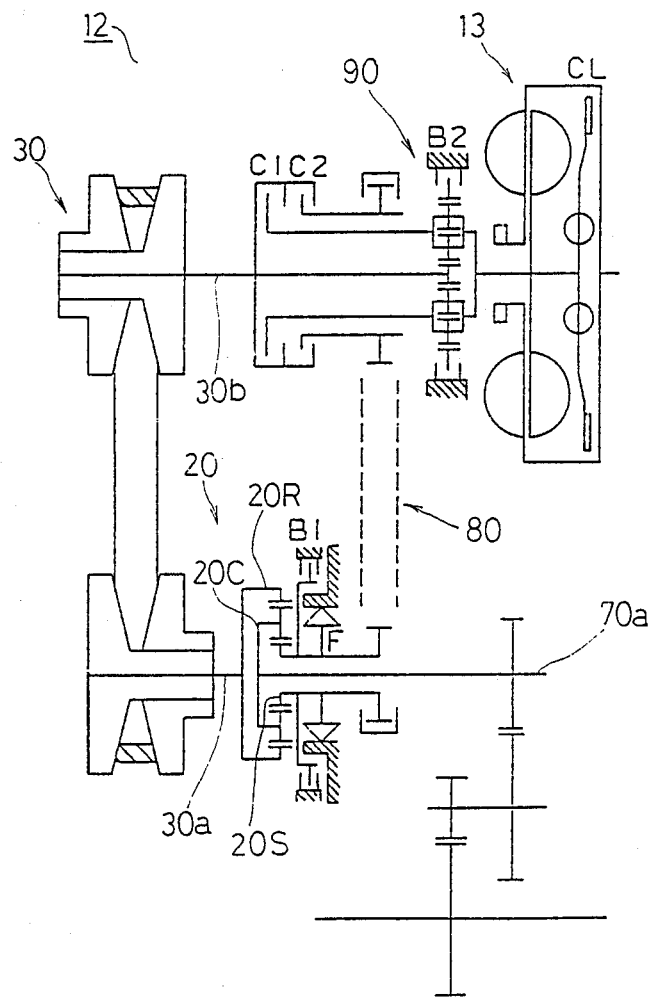

In the example illustrated in FIG. 7, the forward clutch C1 and high speed clutch C2 are located adjacent to the belt driven continuously variable transmission unit 30, while the dual planetary gear unit 90 constituting the reversing means is located adjacent to the fluid coupling 13, and the low speed coast and reverse brake B1 and low speed one-way clutch F are located adjacent to the single planetary gear unit 20 on the secondary shaft 30a, 70a.

Hence, in low speed mode L, the sun gear 20S of the single planetary gear unit 20 is immobilized directly by the low speed one-way clutch F or low speed coast and reverse brake B1, preventing unnecessary torque load from acting on the transfer unit 80.

Figure 8:
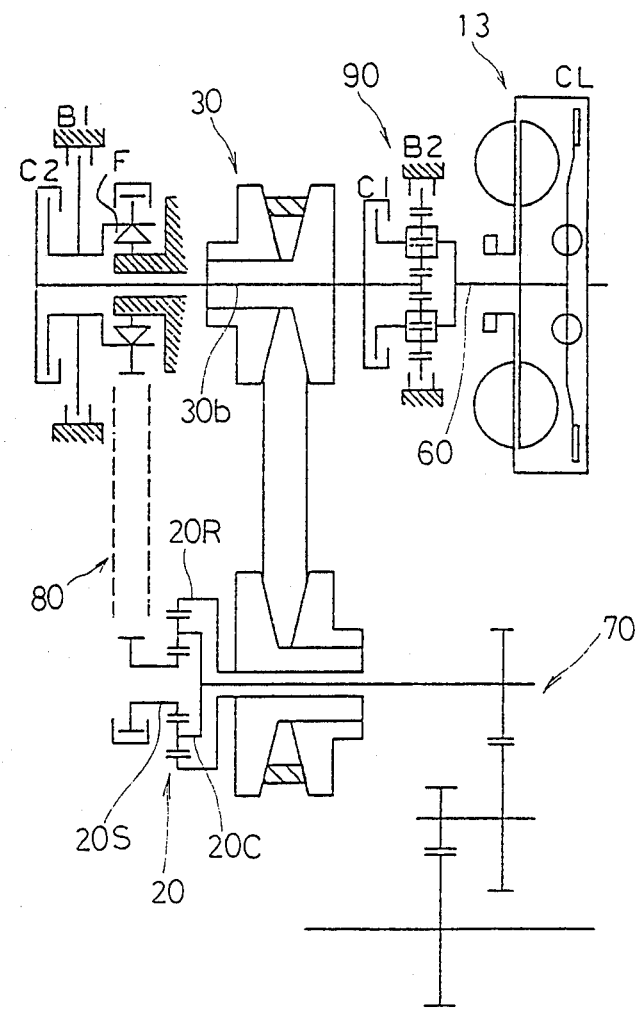

In the example illustrated in FIG. 8, the reversing means or the dual planetary gear unit 90 and the forward clutch C1 are located on one side adjacent to the belt driven continuously variable transmission 30 on the primary shaft 30b, 60, while the shifting unit or the high speed clutch C2, low speed coast and reverse brake B1 and low speed one-way clutch F are located on the other side.

Figure 9:
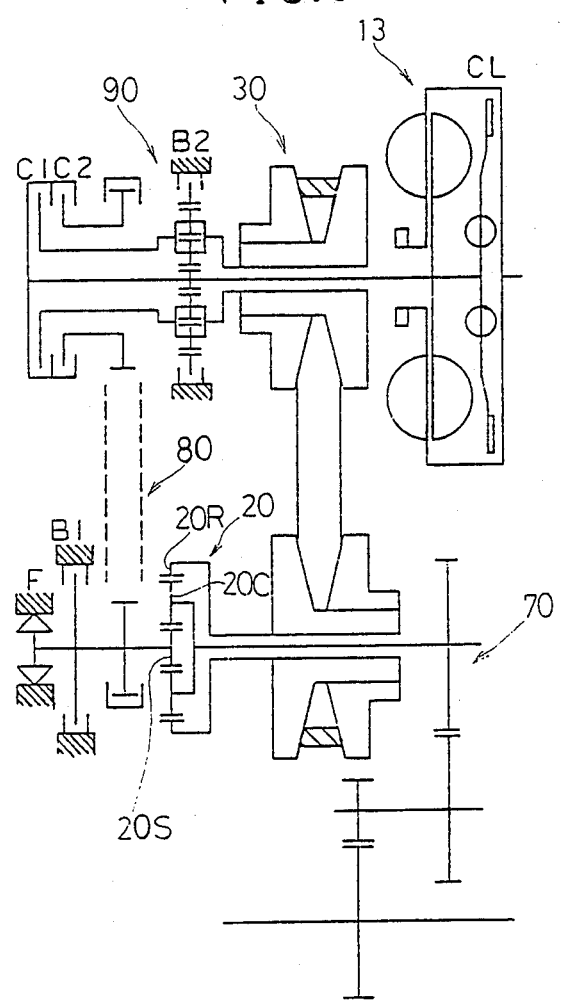

In the example illustrated in FIG. 9, the belt driven continuously variable transmission unit 30 is located adjacent to the fluid coupling 13, with the reversing dual planetary gear unit 90, forward clutch C1, high speed clutch C2 and reverse brake B2 located on the opposite side, with the single planetary gear unit 20, low speed coast and reverse brake B1 and low speed one-way clutch F on the opposite side on the secondary shaft.

Figure 10:
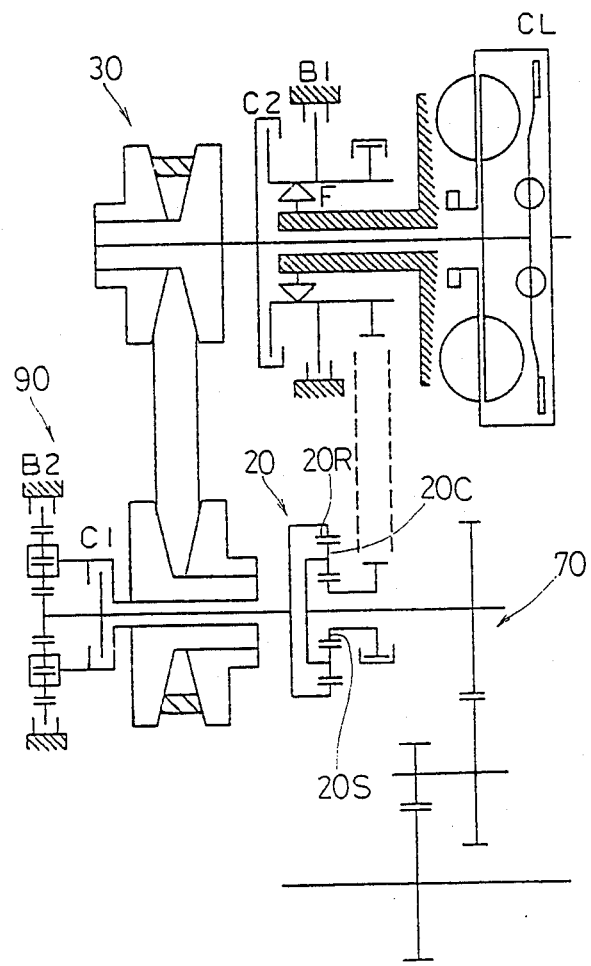

In the example illustrated in FIG. 10, the reversing means 90, forward clutch C1 and reverse brake B2 are located on the secondary shaft adjacent to the belt driven continuously variable transmission unit 30 on the side opposite to the single planetary gear unit 20.

Figure 11:
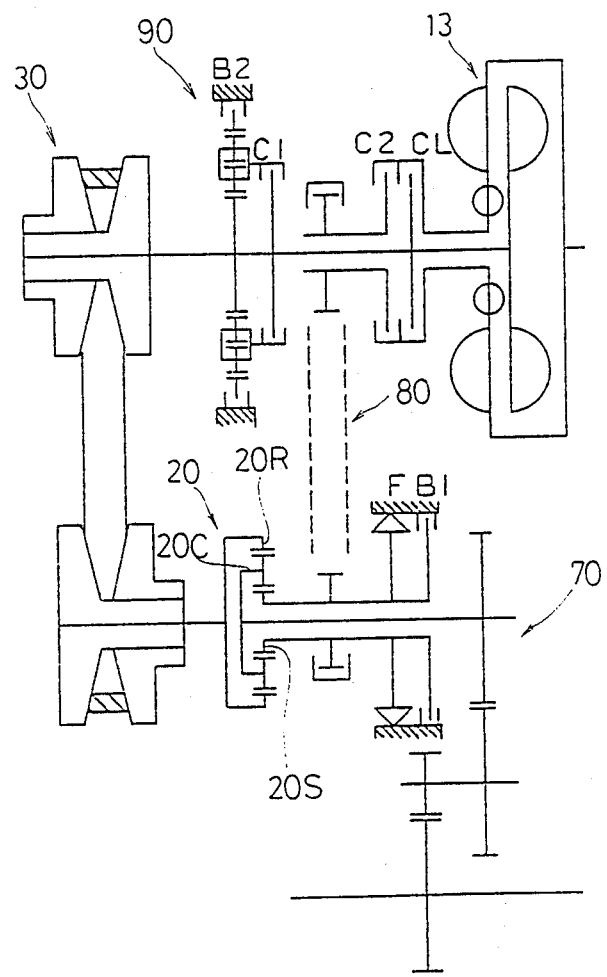

In the example illustrated in FIG. 11, the lock-up clutch CL is separated from the fluid coupling 13 and located adjacent to the high speed clutch C2, while the low speed coast and reverse brake B1 and low speed one-way clutch F are located on the secondasry shaft together with the single planetary gear unit 20.

Figure 12:
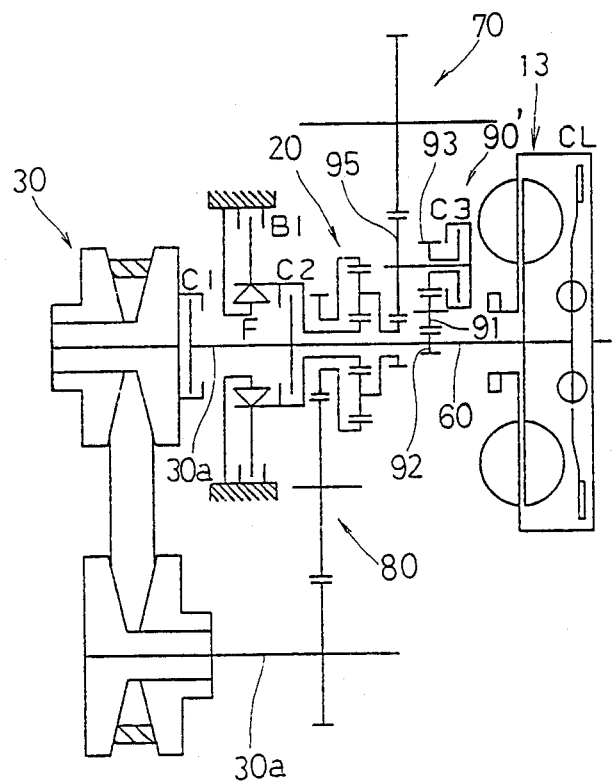

In the example illutrated in FIG. 12, the single planetary gear unit 20, as well as the forward clutch C1, high speed clutch C2, low speed coast and reverse brake B1 and reversing means 90' are all located on the primary shaft, with power output delivered to the output member 70 from the primary end of the transmission. In this example, the reversing means comprises a reverse clutch C3 and an idler pinion 91. Hence in R range, rotation of the input shaft 60 is transmitted to pinion 95 through pinion 92, idler pinion 91, pinion 93 and reverse clutch C3, and finally delivered to the output member 70.

Figure 13:
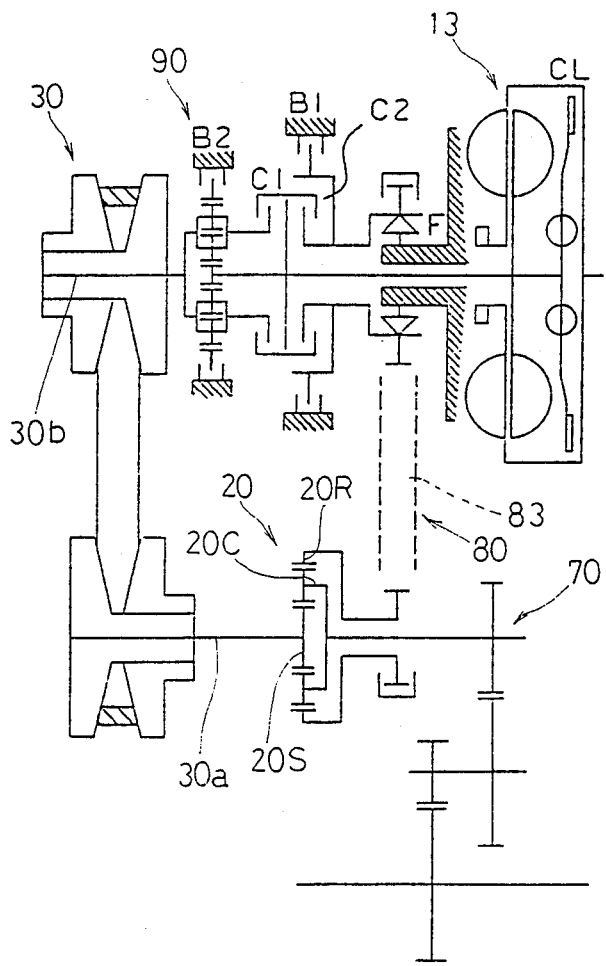

In the example illustrated in FIG. 13, the output shaft 30a of the belt driven continuously variable transmission 30 is connected to the sun gear 20S of the single planetary gear unit 20 with the ring gear 20R connected to the transfer unit 80, as in the example illustrated in FIG. 6, but the transfer unit 80 in this case comprises a chain.

Figure 14:
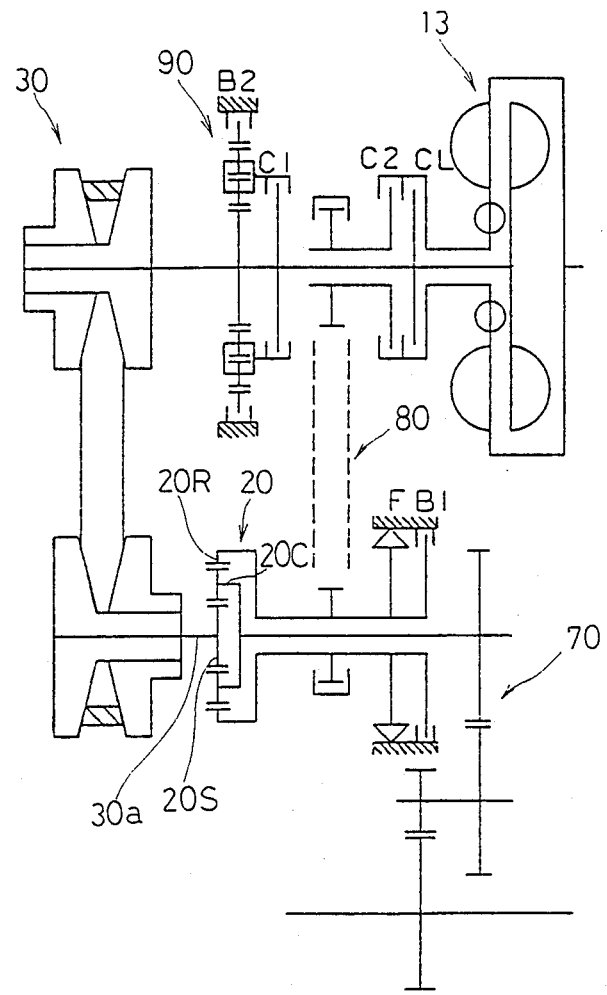

In the example illustrated in FIG. 14, similarly to the example of FIG. 6, the sun gear 20S of the single planetary gear unit 20 is connected to the output shaft 30a of the belt driven continuously variable transmission unit 30 with the ring gear 20R connected to the transfer unit 80, while, similarly to the example of FIG. 11, the low speed one-way clutch F and low speed coast and reverse brake B1 are located on the secondary shaft, with the lock-up clutch CL separated from the fluid coupling 13.

Figure 15:
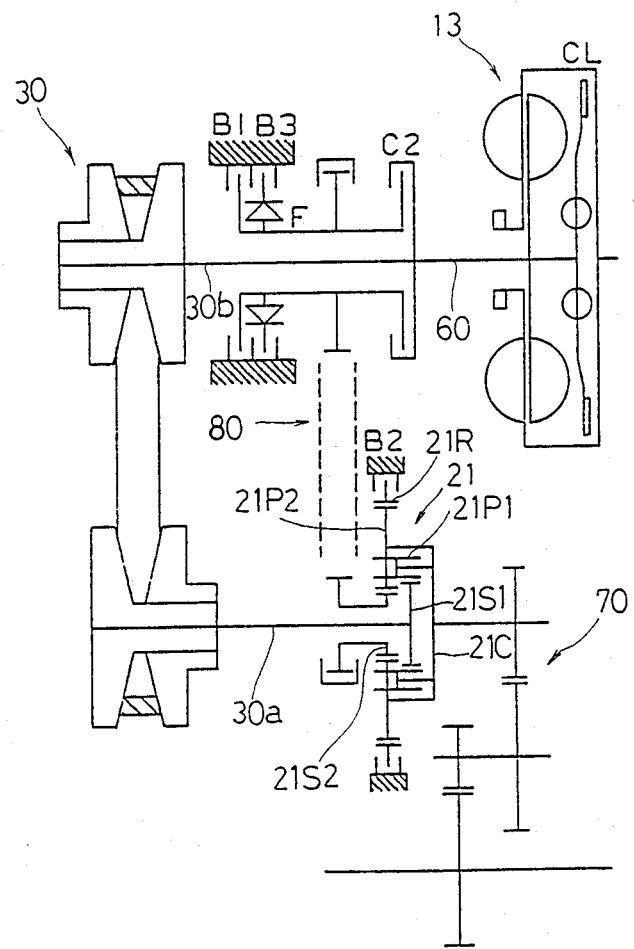

In the example illustrated in FIG. 15, the reversing means and the shifting means are combined, comprising a planetary gear unit of Ravigneaux type, which includes two sun gears 21S1 and 21S2, one 21S1 of which is connected to the input shaft 30b of the belt driven continuously variable transmission unit 30 while the other 21S2 is connected to the transfer unit 80, a carrier 21C supporting two sets of pinions 21P1 and 21P2 in parallel and a ring gear 21R, and provided with a forward brake B3 which is released when in R range.

Hence in low speed mode L, rotation of the output shaft 30a of the belt driven continuously variable transmission unit 30 is transmitted from the first sun gear 21S1 to the axially elongated first pinion 21P1 which engages the second pinion 21P2, which in turn engages the second sun gear 21S2 immobilized by the low speed one-way clutch F or low speed coast and reverse brake B1, to rotate the carrier 21C and transmit reduced rotation to the output member 70. In high speed mode H, rotation of the second sun gear 21S2 driven by the input shaft 60 through the transfer unit 80 and high speed clutch C2, as well as the rotation of the first sun gear 21S1 driven by the belt driven continuously variable transmission unit 30, is fed to the Ravigneaux type planetary gear unit 21. Combined rotation is transmitted to the carrier 21C through the first and second pinions 21P1, 21P2 and to the output member 70. In R range, the forward brake B3 is released to allow the second sun gear 21S2 to rotate freely, while the reverse brake B2 is applied to immobilized the ring gear 21R, resulting in reverse rotation being delivered from the carrier 21C.

Figure 16:
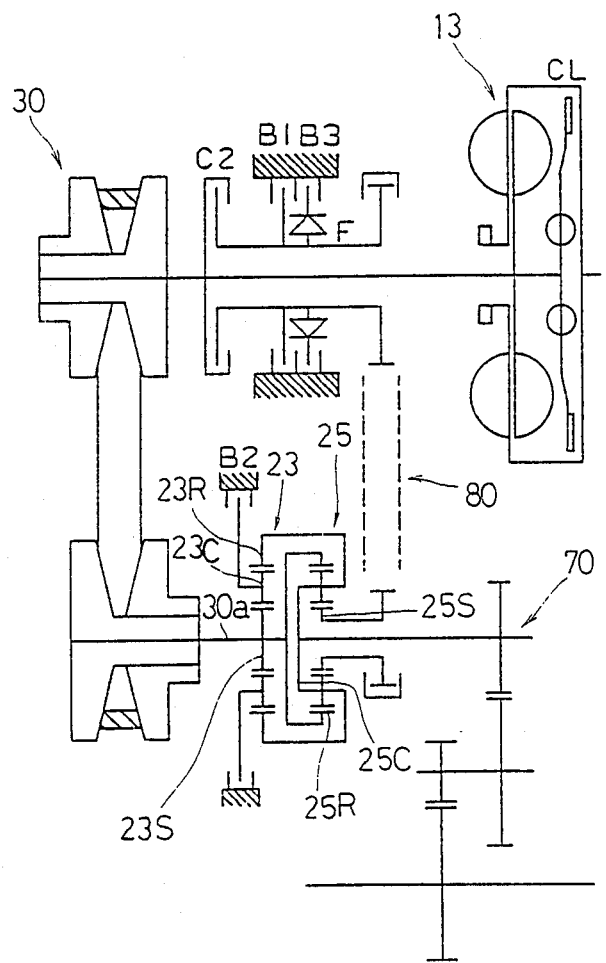

In the example illustrated in FIG. 16, the shifting means and the reversing means comprising a pair of single planetary gear units 23 and 25 arranged in parallel, with the output shaft 30a of the belt driven continuously variable transmission unit 30 connected to the sun gear 23S of the first planetary gear unit 23 and the ring gear 25R of the second planetary gear unit 25, while the ring gear 23R of the first planetary gear unit 23 and the carrier 25C of the second planetary gear unit 25 are fixed to each other, and the carrier 23C of the first planetary gear unit 23 and the sun gear 25S of the second planetary gear unit 25 are connected to the reverse brake B2 and the transfer unit 80 respectively.

Hence in low speed mode L, rotation of the output shaft 30a of the belt driven planetary gear unit 30 is transmitted to the ring gear 25R of the second planetary gear unit 25, and delivered from the carrier 25C to the output member 70 after being reduced in the same planetary gear unit while the sun gear 25S is immobilized by the low speed one-way clutch F or low speed coast and reverse brake B1. In high speed mode H, rotation transmitted through the transfer unit 80 to the sun gear 25S is combined with the rotation of ring gear 25R driven by the belt driven continuously variable transmission unit 30, and delivered to the output member 70. In R range, rotation of the belt driven continuously variable transmission unit output shaft 30a is transmitted to the sun gear 23S of the first planetary gear unit 23, and then transmitted to the ring gear 23R in reverse direction through the pinions on the stationary carrier 23C. Rotation of the ring gear 23R is delivered to the output member 70 through the carrier 25C of the second planetary gear unit 25, as the sun gear 25S is allowed to rotate freely by releasing the forward brake B3.

Figure 17:
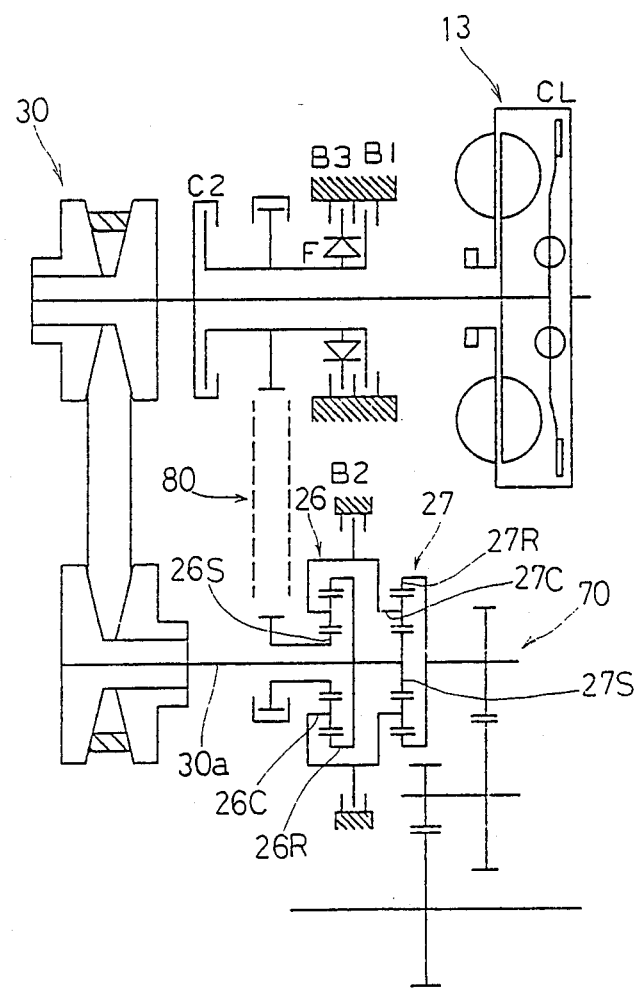

In the example illustrated in FIG. 17, the shifting and reversing means comprise a pair of single planetary gear units 26 and 27 arranged in parallel, where the belt driven continuously variable transmission unit output shaft 30a is connected to the ring gear 26R of the first planetary gear unit 26 and to the sun gear 27S of the second planetary gear unit 27, while the sun gear 26S of the first planetary gear unit 26 is connected to the transfer unit 80 and the ring gear 27R of the second planetary gear unit 27 is connected to the output member 70, with the carriers 26C and 27C of the first and second planetary gear units 26 and 27 fixed to one another.

Hence in low speed mode L, rotation of the output shaft 30a of the belt driven continuously variable transmission unit 30 is transmitted to carrier 26C of the first planetary gear unit 26 from ring gear 26R while the sun gear 26S is stationary, the rotation of carrier 26C being combined in the second planetary gear unit 27 with the rotation of sun gear 27S driven by the output shaft 30a, to be delivered to the output member 70 from the ring gear 27R. In high speed mode H, rotation is transmitted through the transfer unit 80 to the sun gear 26S of the first planetary gear unit 26, where it is combined with the rotation of ring gear 26R driven by the belt driven continuously variable transmission unit output shaft 30a and delivered from the carrier 26C, the rotation of carrier 27C fixed to carrier 26C being combined in the second planetary gear unit 27 with the rotation of sun gear 27S driven by the output shaft 30a, to be delivered to the output member 70 through the ring gear 27R. In R range, the carrier 27C of the second planetary gear unit 27 is immobilized so that the rotation of sun gear 27S driven by the output shaft 30a is transmitted to the ring gear 27R in reverse direction before being delivered to the output member 70.

Figure 18:
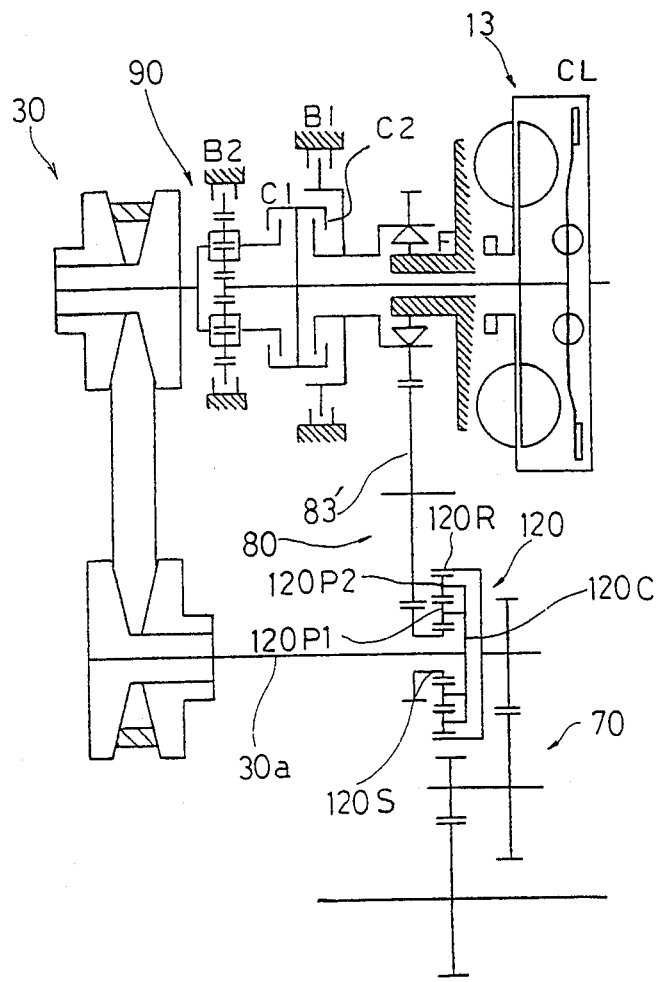

In the example illustrated in FIG. 18, the shifting means comprises a dual planetary gear unit 120, whose carrier 120C supporting pinions 120P1 and 120P2 is connected to the output shaft 30a of the belt driven continuously variable transmission unit 30, while its sun gear 120S is connected to the transfer unit 80 comprising an idler pinion 83, and the ring gear 120R is connected to the output member 70.

Hence in low speed mode L, the rotation of output shaft 30a of the belt driven continuously variable transmission unit 30 is transmitted to the ring gear 120R of the dual planetary gear unit 120 from the carrier 120C while the sun gear 120S is stationary, the reduced rotation being then transmitted to the output member 70. In high speed range H, rotation is transmitted to the sun gear 120S through the transfer unit 80 and combined in the dual planetary gear unit 120 with the rotation of carrier 120C driven by the belt driven continuously variable transmission unit output shaft 30a, the combined rotation being delivered through the ring gear 120R to the output member 70.

Figure 19:
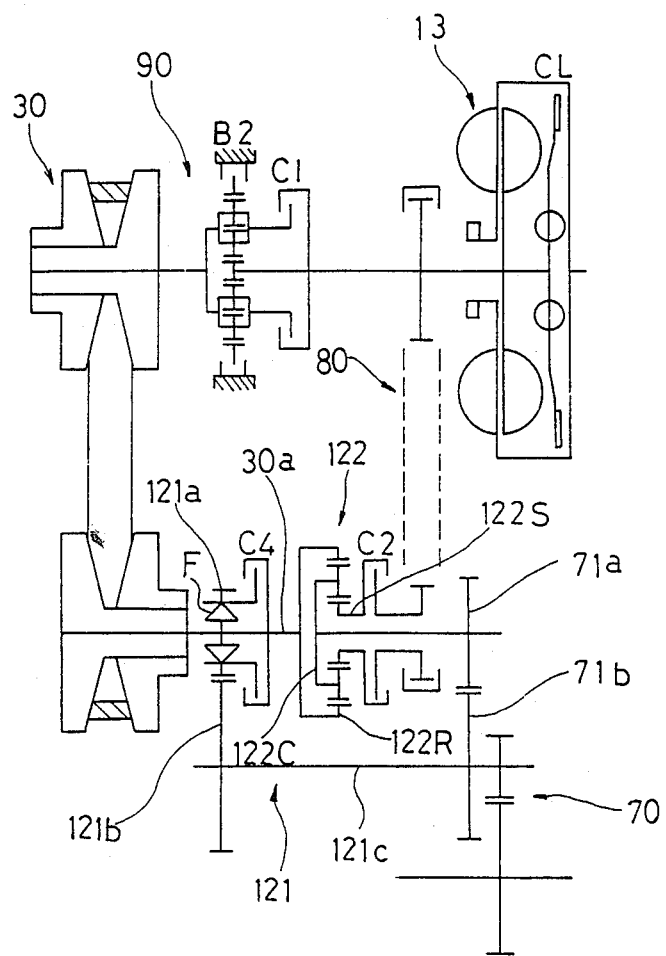

In the example illustrated in FIG. 19, separate transmitting means are provided for the low and high speed modes. The reduction mechanism 121 which operates only in low speed mode L comprises a small pinion 121a, a large pinion 121b engaging the small pinion 121a and a drive shaft 121c connecting the large pinion 121b to the output member 70, while the split-drive mechanism 122 which operates only in high speed mode H comprises a single planetary gear unit. The belt driven continuously variable transmission unit output shaft 30a is connected to the small pinion 121a through a low speed coast and reverse clutch C4, while driving the small pinion 121a through the low speed one-way clutch F, and is also connected to the ring gear 122R of the single planetary gear unit 122. The carrier 122C of the single planetary gear unit 122 is connected to the output member 70, while the sun gear 122S is connected to the transfer unit 80 through the high speed clutch C2.

Hence in low speed mode L, rotation of the output shaft 30a of the belt driven continuously variable transmission unit 30 is transmitted to the small pinion 121a through either the low speed one-way clutch F (in D range) or the low speed coast and reverse clutch C4 (in S range), and to the output member 70 through the large pinion 121b and drive shaft 121c which constitute the reduction mechanism. Meanwhile, although rotation is transmitted from the output shaft 30a to the ring gear 122R of the single planetary gear unit 122, it merely rotates freely without transmitting torque, as the high speed clutch C2 is disengaged. In high speed mode H, rotation is transmitted from the belt driven continuously variable transmission unit output shaft 30a to the ring gear 122R of the planetary gear unit 122 constituting the split-drive mechanism, and from the transfer unit 80 to the sun gear 122S by engagement of the high speed clutch C2, resulting in their combined rotation being transmitted to the output member 70, similarly to the example of FIG. 1. Meanwhile, although rotation is transmitted to the small pinion 121a through pinions 71a, 71b, drive shaft 121c and large pinion 121b, the small pinion merely rotates freely without transmitting torque to the output shaft 30a, due to the presence of the low speed one-way clutch F. When reversing, reverse rotation is transmitted to the continuously variable transmission unit 30 from the dual planetary gear unit 90 constituting the reversing means upon application of reverse brake B2, the reverse output rotation of the continuously variable transmission unit 30 being transmitted to the output member by 70 by engagement of the low speed coast and reverse brake B1.

Figure 20:
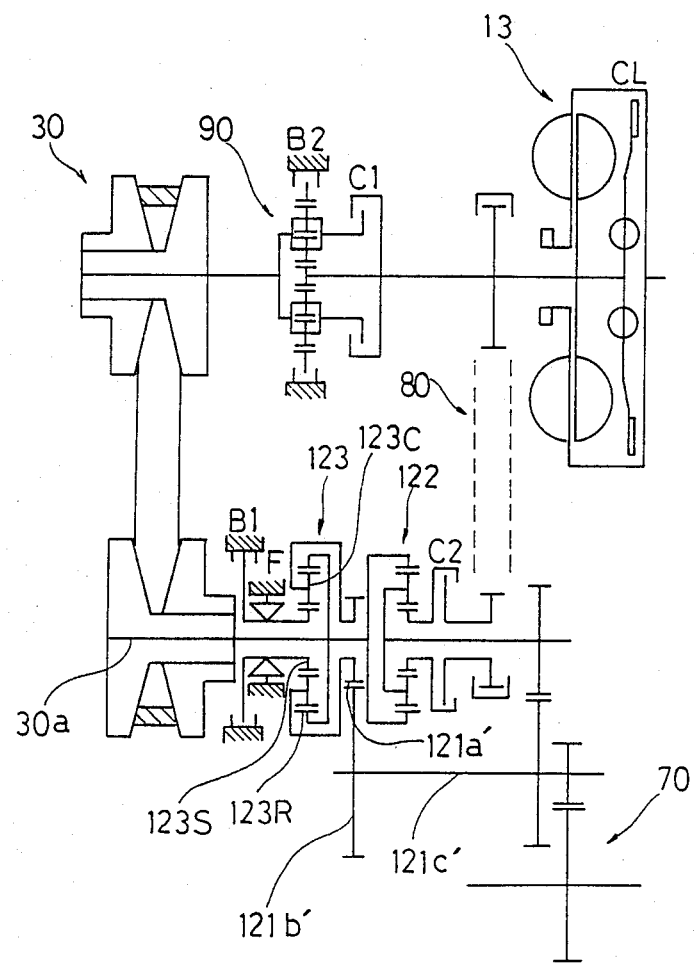

In the example illustrated in FIG. 20 also, separate reduction mechanism and split-drive mechanism are provided for the low and high speed ranges respectively, whereas the reduction mechanism comprises a single planetary gear unit 123 instead of reduction gears. The single planetary gear unit 122 constituting the split-drive mechanism is identical to that used in the example of FIG. 19 described above. The ring gear 123R of the single planetary gear unit 123 is connected to the output shaft 30a of the continuously variable transmission unit 30, while the carrier 123C is connected to a small pinion 121a' coupled to the output member 70, and the sun gear 123S is connected to the low speed one-way clutch F and low speed coast and reverse brake B1.

Hence in low speed mode L, rotation of the continuously variable transmission unit output shaft 30a is reduced and transmitted from ring gear 123R to carrier 123C while the sun gear 123S is immobilized by action of either the low speed one-way clutch F (in D range) or low speed coast and reverse brake B1 (in S range), and to the output member 70 through the small pinion 121a', large pinion 121b' and drive shaft 121c'. In high speed mode H, the high speed clutch C2 is engaged, so that the planetary gear unit 122 constituting the split drive mechanism would combine the rotations of the output shaft 30a and the transfer unit 80 and transmit the combined rotation to the output member 70. Meanwhile, although rotation is transmitted to the carrier 123C of the planetary gear unit 123 constituting the reduction mechanism through pinions 71a, 71b, drive shaft 121c' and pinions 121a', 121b', it takes no part in power transmission since the one-way clutch F is free. When reversing, rotation of the continuously variable transmission output shaft 30a is transmitted to the output member 70 through the planetary gear unit 123 constituting the reduction mechanism, by action of the reverse brake B2 and low speed coast and reverse brake B1.

Figure 21:
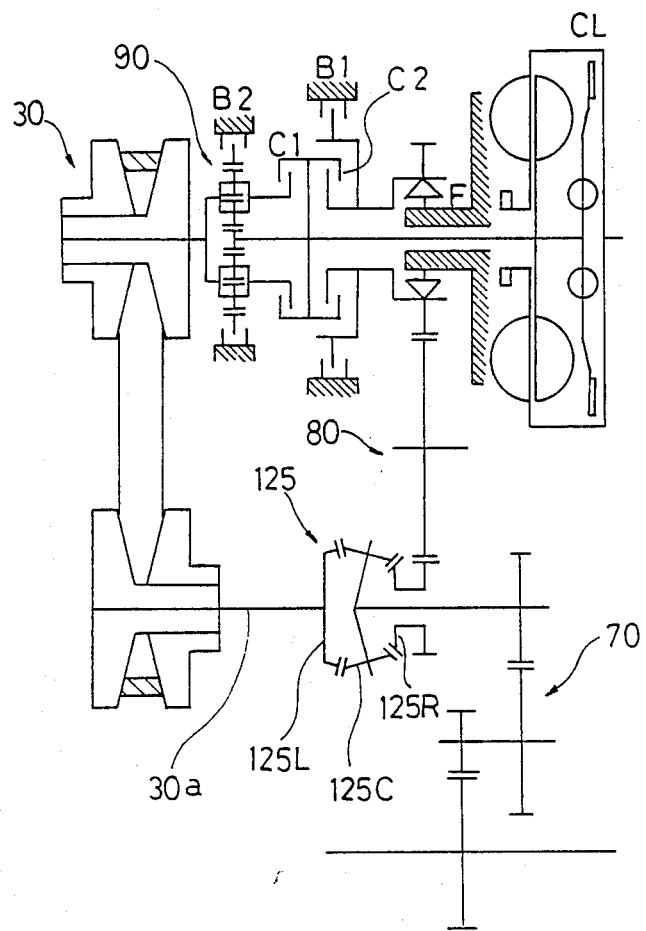

In the example illustrated in FIG. 21, a planetary gear unit 125 comprising bevel gears is used as the shifting means, while the remainder of the transmission is identical to the examples of FIGS. 1 and 6. The left bevel 125L, the right bevel 125R and the center bevel 125C are connected to the continuously variable transmission unit output shaft 30a, the transfer unit 80 and the output member 70 respectively.

Hence in low speed mode L, rotation of the continuously variable transmission unit 30a is reduced and transmitted to the center bevel 125C from the left bevel 125L while the right bevel is immobilized by the low speed one-way clutch F or low speed coast and reverse brake B1, and on to the output member 70. In high speed mode H, rotation of the left bevel 125L driven by the output shaft 30a and rotation of the right bevel 125R driven by the transfer unit 80 are combined in the bevel gear unit 125 and delivered to the output member 70.

Figure 22:
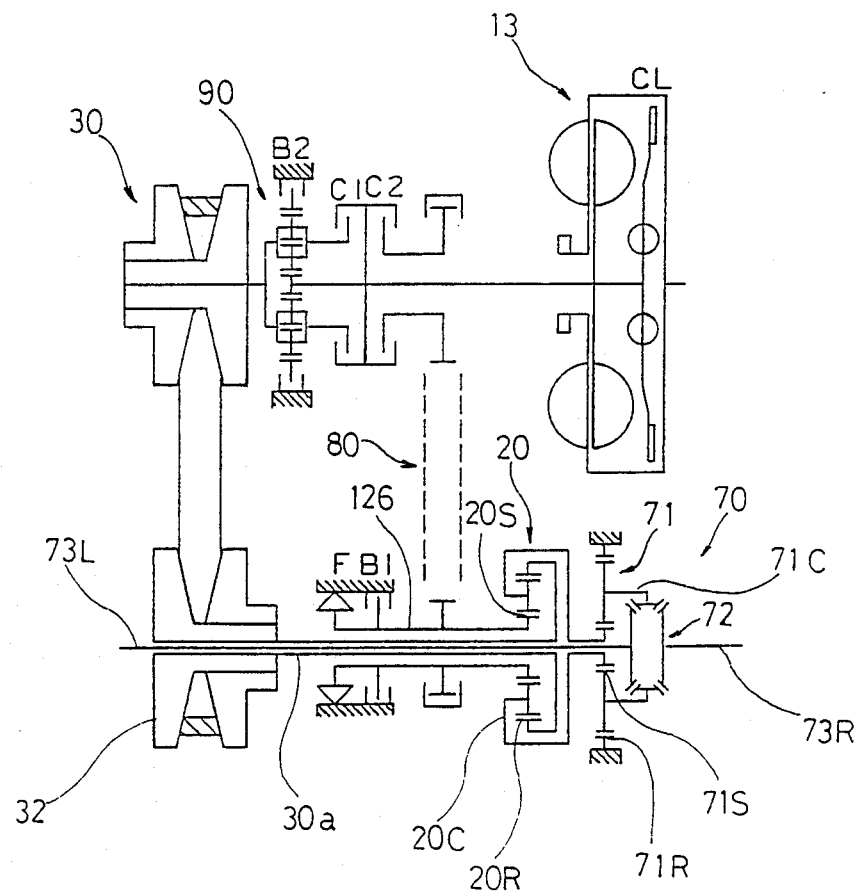
Figure 23:
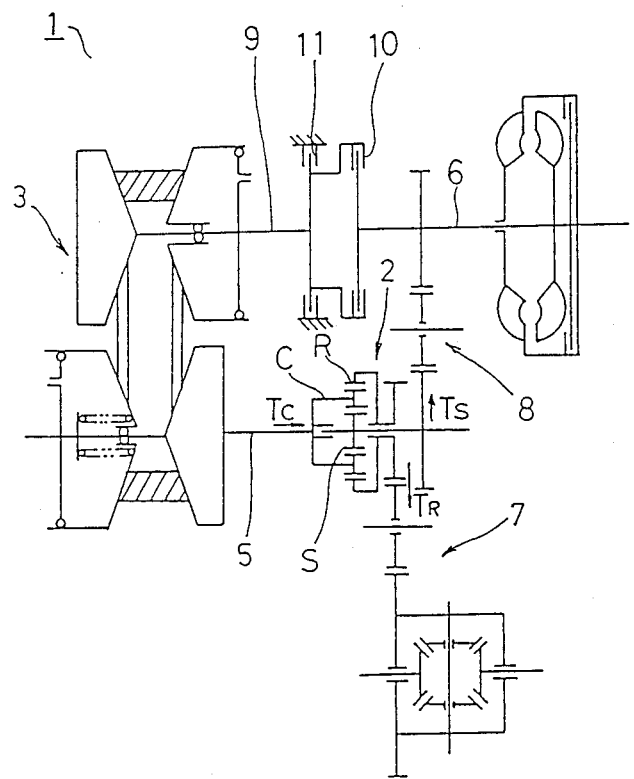
FIG. 23 is a schematic of the prior art.

In the example illustrated in FIG. 22, the secondary shaft is composed of a plurality of concentric shafts in order to obtain a compact design. The hollow output shaft 30a of the continuously variable tranmission unit 30 is connected to the ring gear 20R of the single planetary gear unit 20, while the carrier 20C is connected to the output member 70 by a hollow shaft, and the sun gear 20S is connected to the low speed one-way clutch F and low speed coast and reverse brake B1 as well as the transfer unit 80 by a sleeve shaft 126 rotatably fitted over the hollow output shaft 30a. The output member 70 includes a reduction gear unit 71 and a differential gear unit 72 comprising planetary gear units located coaxially to the single planetary gear unit 20 and secondary pulley 32 of the continuously variable transmission unit 30, with the left hand front axle 73L extending through the hollow output shaft 30a and secondary pulley 32, and the right hand front axle 73R extending to the right. The sun gear 71S of the reduction gear unit 71 is connected to the carrier 20C of the single planetary gear unit 20, while the ring gear 71R is fixed to the frame, and the carrier 71C is connected to the input to the differential gear unit.

The benefits attained by the embodiments of the present invention are summarized as follows.

The gear unit 20 constitutes a simple reduction mechanism in low speed mode L of the continuously variable transmission 12, and constitutes a split-drive mechanism in high speed mode H. Thus, while expanding the range of torque ratio for the entire continuously variable transmission to improve fuel economy and transmission performance, the share of torque transmitted by the continuously variable transmission unit 30 is significantly reduced and its rotation decreased in high speed mode H used under cruising conditions which generally occupies a larger portion of the running time compared to the low speed mode L used mainly during acceleration, improving the durability of the transmission as a result. Also, transmission efficiency is improved in high speed mode H, since part of the torque is transmitted by the transfer unit 80 comprising gears or chain with higher tranmission efficiency compared to the continuously variable transmission unit 30 comprising frictional transmission means. Further, swift kick-down is made possible by switching the role of the gear unit from split-drive to reduction mechanism.

By adopting a planetary gear unit for the reduction and split-drive mechanisms, the transmission can be made compact.

When a Vee belt driven continuously variable transmission unit is used for the continuously variable transmission unit 30, solution is facilitated to the problem of poor belt durability which has been preventing practical application of the belt driven continuously variable transmission units, since the load on the belt could be reduced without restricting the torque transmitting capacity of the entire transmission 12.

By comprising the third element of the planetary gear unit 20 connected to the transfer unit 80 and arresting means (low speed one-way clutch, low speed coast and reverse brake) with a member capable of supporting the reaction which occurs when the planetary gear unit is functioning as a reduction gear mechanism, the formation of torque loop can be avoided when the planetary gear unit 20 is functioning as a split-drive mechanism, reducing the share of torque transmitted through the belt driven continuously variable transmission unit 30, to enable realisation of a continuously variable transmission 12 which has sufficient torque transmitting capacity and adequate durability while retaining compactness of design.

Further, by comprising the first element of the single planetary gear unit 20 which is connected to the output 3a of the belt driven continuously variable transmission unit 30 with a ring gear 20R, the second element connected to the output member 70 with a carrier 20C, and the third element connected to the transfer unit 80 with a sun gear 20S, the step ratio between the low and high speed modes L, H can be made relatively small, so that a continuously variable transmission with little shift shock can be obtained, while providing the necessary range of torque ratio.

Otherwise, by comprising the first element of the planetary gear unit 20 with a sun gear 20S, the second element with a carrier 20C and the third element with a ring gear 20R, the step ratio between the low and high speed modes L, H is increased, increasing the share of torque transmitted by the transfer unit 80 thereby further reducing the load on the belt, in addition to providing a continuously variable transmission with a wider range of torque ratio.

By using a one-way clutch F and a low speed coast and reverse brake B1 as the arresting means for the third element 20S or 20R, smooth shifting without shock is made possible by the one-way clutch F, while the low speed coast and reverse brake B1 enables reliable transmission of reverse torque such as encountered during application of engine brake.

If the arresting means (low speed one-way clutch F, low speed coast and reverse brake B1) are located on the primary shaft coaxial to the primary pulley 31 of the belt driven continuously variable transmission unit 30, combined with the arrangement of the remaining control devices (forward clutch C1 (or forward brake B3), high speed clutch C2, reverse brake B2), the axial dimension of the transmission can be reduced to provide a compact design, and the hydraulic circuit can be simplified as all control devices are located on the primary shaft.

On the other hand, if the arresting means (low speed one-way clutch F, low speed coast and reverse brake B1) are located on the secondary shaft coaxial to the secondary pulley 32 of the belt driven continuously variable transmission unit 30, the reaction in the planetary gear unit 20 when the unit is functioning as a reduction means is prevented from acting on the transfer unit 80, thus improving the durability of the transfer unit 80.

By using separate gear units for the reduction mechanism 121, 123 and split-drive mechanism 122, the transmitting path in the gear unit is separated for low and high speed modes L, H, improving the durability of the gear units, and enabling the selection of torque ratio in low speed mode L without affecting the share of transmitted torque in high speed mode H. Therefore, even when the gear ratio of the planetary gear unit is selected to reduce the share of torque transmitted by the continuously variable transmission unit 30 (for example, by selecting a large gear ratio $\rho(=Z_x/Z_r)$ for the single planetary gear unit 122 of FIGS. 19 and 20), a desired step ratio can still be obtained by adjusting the gear ratio of the reduction mechanism 121, 123, thus increasing the degree of freedom in design.

Further, by inserting the low speed clutch C3 and the low speed one-way clutch F in between the output 30a of the continuously variable transmission unit 30 and the gear unit 121 which serves as the reduction means (see FIG. 20), shifting up to high speed mode can be made smoothly.

What is claimed is:

1. A continuously variable transmission comprising an input member, a continuously variable transmission unit which converts the rotation of said input member by continuously variable ratios, a gear unit to which the output torque from said continuously variable transmission unit is fed, a transfer unit connecting said gear unit to said input member and an output member to which the output torque from said gear unit is delivered, wherein said gear unit comprises a reduction mechanism which multiples the torque from said continuously variable transmission unit and transmits it to said output member, and a split-drive mechanism which combines the output torque from said continuously variable transmission unit with the torque transmitted through said transfer unit and delivers the combined torque to said output member, said transmission further comprising selector means for selectively activating one of the reduction mechanism and the split-drive mechanism, where the reduction mechanism is activated in low speed mode and the split-drive mechanism is activated in high speed mode, and a gear element which receives torque from said transfer unit in said split-drive mechanism of said gear unit and serves as a reaction supporting member when said reduction gear mechanism functions, whereby torque loop is prevented when said split-drive mechanism functions.

2. A continuously variable transmission according to claim 1, in which said gear unit comprises a planetary gear unit whose first, second and third elements are connected respectively, to the output of said continuously variable transmission unit, said output member and said transfer unit, and said selector means comprising an arresting means and a clutch, whereas the third member of said planetary gear unit can be immobilized by said arresting means and said clutch is located in between said third member and said input member, the planetary gear unit functioning as a reduction mechanism in low speed mode by activation of said arresting means, and as a split-drive mechanism in high speed mode by engagement of said clutch.

3. A continuously variable transmission according to claim 2, in which said continuously variable transmission unit is a belt driven continuously variable transmission unit comprising a primary pulley and a secondary pulley whose effective diameters can be altered, and an endless belt fitted around said pulleys.

4. A continuously variable transmission according to claim 3, further comprisisng a primary shaft coaxial to the primary pulley of said belt driven continuously variable transmission unit, said arresting means being located on the primary shaft.

5. A continuously variable transmission according to claim 3, further comprising a secondary shaft coaxial to the secondary pulley of said belt driven continuously variable transmission unit, said arresting means being located on the secondary shaft.

6. A continuously variable transmission according to claim 2, in which the third element of said planetary gear unit serves as a reaction supporting member when the planetary gear unit is functioning as a reduction mechanism.

7. A continuously variable transmission according to claim 6, in which said planetary gear unit is a single planetary gear unit, whose first, second and third elements are respectively, the ring gear, the carrier and the sun gear.

8. A continuously variable transmission according to claim 6, in which said planetary gear unit is a single planetary gear unit, whose first, second and third elements are respectively, the sun gear, the carrier and the ring gear.

9. A continuously variable transmission according to claim 2, in which said arresting means comprises a one-way clutch and a brake.

10. A continuously variable transmission according to claim 1 in which said selector means comprises a low speed clutch, a high speed clutch and a low speed one-way clutch, with the low speed clutch and the low speed one-way clutch being inserted in between the output of said continuously variable transmission unit and said one gear unit which serves as the reduction mechanism.

11. A continuously variable transmission comprising:

an input member for receiving an input power, an output member for transferring an output power from the transmission, a continuously variable transmission unit connected to the input member for continuously changing a rotational number transmitted from the input member to a different rotational number, a transfer unit connected to the input member for transmitting torque from the input member to the output member, a gear unit connected to the continuously variable transmission unit and the transfer unit, said gear unit including a reduction mechanism for multiplying torque applied thereto and transmitting the torque to the output member, and a split drive mechanism for combining output torque from the continuously variable transmission unit and output torque passing through the transfer unit and transmitting the torque to the output member, and selector means for selectively activating the split-drive mechanism, said selector means including arresting means for preventing actuation of said transfer unit in a low speed mode so that the output torque passing through the continuously variable transmission unit is only transmitted to the gear unit where the reduction mechanism is activated in the gear unit, said arresting means being operated in a high speed mode so that the output torque passing through the transfer unit as well as the output torque passing through the continuously variable transmission unit are supplied to the gear unit without imparting counter torque against the input member through the transfer unit where the split-drive mechanism is activated in the gear unit.

* * * * *